(12) United States Patent
Kurushima

(10) Patent No.: US 9,260,624 B2
(45) Date of Patent: Feb. 16, 2016

(54) COATING MATERIAL SPRAY MIST TREATMENT METHOD

(75) Inventor: Takeo Kurushima, Kanagawa (JP)

(73) Assignee: UV TECH CO. LTD., Kanagawa (JP)

( * ) Notice: Subject to any disclaimer, the term of this patent is extended or adjusted under 35 U.S.C. 154(b) by 0 days.

(21) Appl. No.: 14/129,741

(22) PCT Filed: Dec. 21, 2011

(86) PCT No.: PCT/JP2011/079662
§ 371 (c)(1),
(2), (4) Date: Dec. 27, 2013

(87) PCT Pub. No.: WO2013/008350
PCT Pub. Date: Jan. 17, 2013

(65) Prior Publication Data
US 2014/0114015 A1    Apr. 24, 2014

(30) Foreign Application Priority Data

Jul. 8, 2011 (JP) ................................. 2011-152205

(51) Int. Cl.
*C09D 133/00* (2006.01)
*B01D 47/02* (2006.01)
(Continued)

(52) U.S. Cl.
CPC .............. *C09D 133/00* (2013.01); *B01D 47/02* (2013.01); *B01D 47/027* (2013.01);
(Continued)

(58) Field of Classification Search
CPC ...... C09D 133/00; C09D 7/008; B01D 47/02; B01D 47/027; B01D 2247/105; B01D 2247/14; B05B 15/1266; B05B 15/1262; B05B 15/12

USPC ..................................... 524/556; 521/40–49.8
See application file for complete search history.

(56) References Cited

U.S. PATENT DOCUMENTS 3,723,148 A * 3/1973 Tupper .................... 106/287.23
4,935,113 A * 6/1990 Mayer-Schwinning et al. ............................ 204/554
(Continued)

FOREIGN PATENT DOCUMENTS

CN     201558643 U    8/2010
CN     101835523 A    9/2010
(Continued)

OTHER PUBLICATIONS

International Search Report for PCT/JP2011/079662 dated Apr. 24, 2012.
(Continued)

*Primary Examiner* — Frances Tischler
(74) *Attorney, Agent, or Firm* — Marshall, Gerstein & Borun LLP

(57) ABSTRACT

Provided is a treatment method that directly and separately separates and recovers a resin phase and an inorganic filler phase from a coating mist for an organic solvent-based coating used in general coating application. In a method that collects an organic solvent-based coating spray mist, the treatment method for the organic solvent-based coating spray mist is characterized by including a step for collecting the spray mist by bringing the organic solvent-based coating spray mist into contact directly and at high speed with water that comprises strong alkaline electrolysis water and in which the pH is maintained at 9 or higher and ORP is +200 mV or lower and a step for thereafter separating a solid portion, which has been formed, from the water that comprises the strong alkaline electrolysis water in which the spray mist has been collected. Additionally, the coating mist can be recovered with excellent efficiency and as a reusable resource.

5 Claims, 6 Drawing Sheets

(51) Int. Cl.
*B05B 15/12* (2006.01)
*C09D 7/00* (2006.01)

(52) U.S. Cl.
CPC ........ *B05B 15/1262* (2013.01); *B05B 15/1266* (2013.01); *B01D 2247/105* (2013.01); *B01D 2247/14* (2013.01); *B05B 15/12* (2013.01); *C09D 7/008* (2013.01)

(56) References Cited

U.S. PATENT DOCUMENTS

| | | | |
|---|---|---|---|
| 5,378,389 | A | 1/1995 | Mizuno et al. |
| 8,435,348 | B2 | 5/2013 | Tashiro |

FOREIGN PATENT DOCUMENTS

| | | |
|---|---|---|
| CN | 201832755 U | 5/2011 |
| EP | 1 065 170 A1 | 1/2001 |
| JP | 51-20234 A1 | 2/1976 |
| JP | H0568920 | 3/1993 |
| JP | 2002-331220 A | 11/2002 |
| JP | 3464279 B2 | 11/2003 |
| JP | 2006-181503 A | 7/2006 |
| JP | 2006181503 A | 7/2006 |
| JP | 5120234 B2 | 1/2013 |
| WO | WO-9112311 A1 | 8/1991 |
| WO | WO-2010/131564 A1 | 11/2010 |
| WO | WO-2011/067689 A1 | 6/2011 |

OTHER PUBLICATIONS

First Office Action for Chinese Application No. 2011800721885, dated Sep. 3, 2014.
Office Action in Korean Application No. 10-2014-7003345 dated Jul. 23, 2015.
European Search Report in Application No. 11 86 9320 dated Jan. 29, 2015.
Denkaisui no kiso to riyougijyutsu "Fundamentals and Techniques of Utilizing Electrolyzed Water", Gihodo Shuppan Co., Ltd. Jan. 25, 2000, 26 pages (with English translation).
Notice of Appeal, JP Application No. 5286580 dated Aug. 11, 2015, 32 pages (with English translation).

* cited by examiner

COATING MATERIAL SPRAY MIST TREATMENT METHOD

TECHNICAL FIELD

The present invention relates to a method for treating the surplus coating material spray mist of an organic solvent-based coating (hereunder also referred to simply as "coating mist"), by which a phase mainly comprising a resin component used in the coating and an inorganic filler phase mainly comprising a metal compound likewise used in the coating such as a pigment and a filler material can be efficiently isolated from the surplus coating material spray mist and these phases can be separately recovered in their reusable forms.

BACKGROUND ART

In the fields such as the metal-coating and plastic-coating fields, there has conventionally been known a method for spraying a coasting on a subject to be coated for the preparation of a coated article.

Under the present circumstances, however, it has been recognized that such a method suffers from the following problem. The coating actually sprayed on a subject to be coated is not entirely applied to or deposited on the subject, but 20 to 80% of the sprayed coating is lost in the form of surplus coating material spray mist without being rightly applied onto the surface of the subject.

Such surplus coating material spray mist cannot be left just as it is and therefore, the coating mist should be collected and it must then be processed in some way. As a means for collecting the surplus coating mist, there has currently been adopted a method comprising the step of collecting the surplus coating mist through aspiration or suction while using a suction fan so that any worker involved in the spray-coating operations never takes the same in his body system during the respiration or breathing. However, this method requires the use of any additional treatment of the surplus coating mist after the collection thereof through the aspiration.

It has been common that a paint spray booth (a wet paint spray booth) is used during the coating or spraying operations.

More specifically, there has been known a method for treating coating mist, in which the foregoing paint spray booth (wet paint spray booth) used in the method is equipped with a device for treating the coating mist which is put side by side with the paint spray booth, and which comprises the steps of providing a pool for accumulating, for instance, tap water, industrial water or underground water, as circulating water, and bringing the circulating water into contact with the coating mist to thus collect and recover the latter.

An embodiment of such a wet paint spray booth is shown in FIG. 2 attached hereto.

In FIG. 2, circulating water 12 in the circulating water system is sent to a conduit pipe 24 through a pipe arrangement 11 provided with a pump 23, the circulating water overflowing from one side of the conduit pipe runs down along a water curtain plate 22, while the coating mist 20 sprayed through a spray gun 19 for coating is entrained in or accompanied by the air stream 27 generated by the action of a suction fan 8 to thus collect the coating mist 20 and to thereby store the same in a water tank 1.

To separate the coating mist 20, which has been entrained in and mixed with the circulating water 12, into its solid content and water, it has been common that a flocculating agent 25 (an alkaline agent or an acidic agent) and further a modifying agent are incorporated into the circulating water 12 for the purpose of settling the coating mist 20 in the water to thus convert the latter into sludge 15.

When it is intended to reuse the circulating water 12, it would be necessary to eliminate any adverse effect due to, for instance, the clogging of the pipe arrangement 11 with the coating mist or the solid content thereof and accordingly, a filter 26 is attached to the pipe arrangement for the removal of these materials, which may cause any clogging, through the filtration of the circulating water 12. The circulating water can thus be returned back to the conduit pipe 24 through the pipe arrangement 11 provided with a pump 23 for the recirculation of the same.

It has been the current status of the wet paint spray booth that the components of a coating have been collected and recovered from the coating mist 20 in this manner, while making use of circulating water 12.

However, there have been known various kinds of coatings used properly depending on various purposes or applications and there have not yet been known any flocculating and/or modifying agent which can effectively be used for all of such coatings of different kinds.

In addition, even if an agent such as a flocculating or modifying agent is quite compatible with a coating, the concentration thereof included in the circulating water should always be managed or controlled accurately so that the agent can actually exert its full effect.

Moreover, in the conventional treating method of coating mist of an organic solvent-based coating, the resulting sludge 15 is, in general, one comprising a resin phase containing a resin component such as an epoxy resin, an acrylic resin and an alkyd-melamine resin and a phase comprising inorganic fillers mainly composed of metal compounds such as pigments and fillers, which are mixed with one another, even if all of the foregoing requirements are completely satisfied. For this reason, any conventional method cannot efficiently separate the resin phase from the inorganic filler phase and separately recover them in their reusable forms (see, for instance, the passages appearing in the section [0003] included in Patent Document 1 specified below).

The circulating water used in the wet paint spray booth employed in the foregoing conventional method is simply city water, industrial water or underground water. For instance, in case where city water is used as the circulating water, the pH value thereof ranges from 6.5 to 7.5 and the ORP value thereof ranges from about +400 mV to about +650 mV, although city water may vary from region to region and accordingly, the physicochemical properties thereof may likewise vary.

PRIOR ART DOCUMENT

Patent Document

Patent Document 1: JP-A-2006-181503

SUMMARY OF INVENTION

It is an object of the present invention to provide a method for directly and separately isolating coating mist of an organic solvent-based coating used in general coating applications into a phase mainly comprising a resin for coatings (hereunder also referred to as "resin phase" simply) and an inorganic filler phase mainly comprising a metal compound (hereunder also referred as "inorganic filler phase" simply) to thus recover these phases separately.

According to the conventional method in which the coating mist is treated with circulating water in a paint spray booth, the coating mist formed is a sludge-like material which is turbid because of the presence of fine coating particles and more particularly, this sludge is one comprising a resin phase and an inorganic filler phase, which are present in the form of a mixture, as has been described above.

It is quite difficult to handle such a sludge, since the resin phase and the inorganic filler phase are admixed together to form a mixture and this makes it impossible to directly isolate the sludge into the resin phase and the inorganic filler phase to thereby recover these phases separately. Accordingly, one cannot help but dispose the sludge of this kind.

The present invention thus relates to the following:

(1) A method for treating spray mist of an organic solvent-based coating, characterized in that, in a method for collecting the spray mist of the organic solvent-based coating, it comprises the steps of collecting the spray mist of the organic solvent-based coating by directly bringing the spray mist into contact with water which comprises strongly alkaline electrolysis water and whose pH value and ORP value are maintained at a level of not less than 9 and a level of not more than +200 mV, respectively, and leading the spray mist to collide with the water, at a high velocity, to thereby form solid contents; and subsequently separating the resulting solid contents from the water comprising strongly alkaline electrolysis water in which the spray mist has been collected.

(2) The method for treating spray mist of an organic solvent-based coating as set forth in the foregoing item 1, characterized in that a strongly alkaline electrolysis water having a pH value of not less than 9.5 and an ORP value ranging from −960 mV to 0 mV is added to the water comprising strongly alkaline electrolysis water from which the solid contents have been separated and that the resulting mixture is used as the water which comprises strongly alkaline electrolysis water and whose pH value and ORP value are maintained at a level of not less than 9 and a level of not more than +200 mV, respectively.

(3) The method for treating spray mist of an organic solvent-based coating as set forth in the foregoing item 1 or 2, characterized in that the solid contents comprise a precipitated inorganic filler phase mainly comprising metal compounds and a floating phase mainly comprising a resin for coating.

(4) The method for treating spray mist of an organic solvent-based coating as set forth in the foregoing item 2, characterized in that the strongly alkaline electrolysis water to be added has a pH value ranging from 11 to 14 and an ORP value ranging from −960 mV to −200 mV.

(5) The method for treating spray mist of an organic solvent-based coating as set forth in any one of the foregoing items 1 to 4, characterized in that the spray mist of the organic solvent-based coating is directly brought into contact with the water which comprises strongly alkaline electrolysis water and whose pH value and ORP value are maintained at a level of not less than 9 and a level of not more than +200 mV, respectively, and is allowed to collide with the water at a high velocity, while the spray mist is entrained in a high speed air stream, to thus compulsorily agitate and mix the spray mist and the water, and thereby a floating phase mainly comprising a resin for coating and a precipitated inorganic filler phase mainly comprising a metal compound are isolated from the spray mist.

(6) The method for treating spray mist of an organic solvent-based coating as set forth in any one of the foregoing items 1 to 5, characterized in that the water comprising strongly alkaline electrolysis water from which the solid contents have been separated is recycled and reused.

In the method according to the present invention, coating mist is directly brought into contact with the water comprising strongly alkaline electrolysis water and the coating mist is allowed to collide with the water comprising strongly alkaline electrolysis water at a high velocity so that the coating mist and the water are stirred together. For this reason, the coating mist can be separately isolated into two phases (in other words, a resin phase and an inorganic filler phase) and the coating mist can thus be treated in high efficiency, in the present invention.

Moreover, the treating process according to the present invention never releases any bad smell into the surrounding environment and it can therefore provide better working environment and excellent surrounding environment. In addition, the sludge of coating isolated according to the process or the resin phase and the inorganic filler phase thus separated can manually or automatically be separated from one another. The floating resin phase can be used as secondary or subsidiary materials in, for instance, cement in the form of a resin exhibiting weak alkaline properties, after the phase is subjected to a post-treatment such as concentration and/or drying, while the inorganic filler phase can likewise be reused or recycled as an additive for coating and that for pigments, after it is further purified.

MODE FOR CARRYING OUT INVENTION

Figure 1:
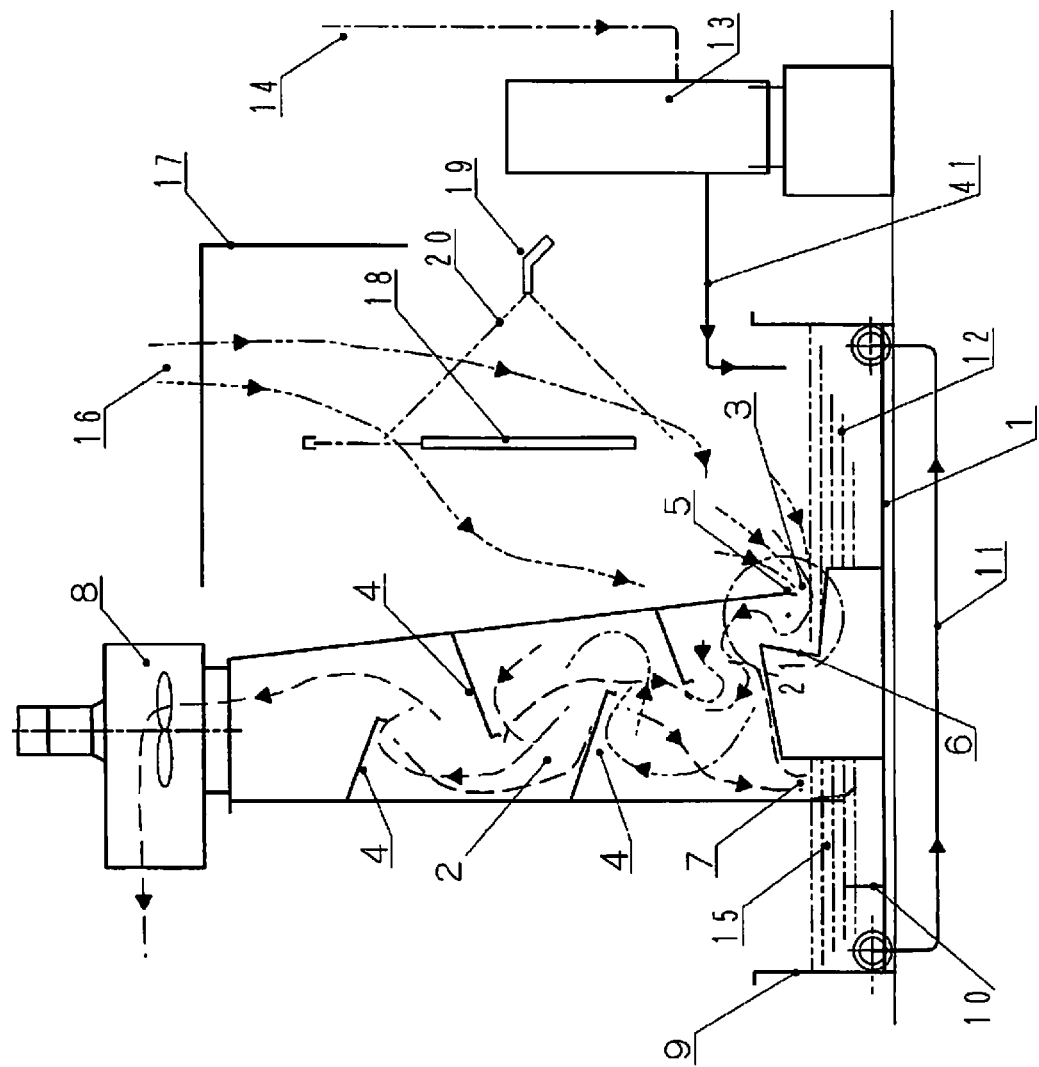
FIG. 1 is a diagram showing the cross sectional view of a coating mist-treating device equipped with a paint spray booth according to one embodiment of the present invention and also showing a device for forming strongly alkaline ionized water.

The inventor of this invention has found out a treating method which can directly isolate coating mist into a resin phase and an inorganic filler phase in their reusable forms and separately recover these two phases, while using, as circulating water for the collection of the coating mist, water to which strongly alkaline electrolysis water has been added and whose pH value and ORP value are maintained at a level of not less than 9 and a level of not more than +200 mV, respectively, and have thus completed the present invention.

Unlike the conventional method for the collection of coating mist, which makes use of simple circulating water, it has been proved that, as a result of the intensive studies implemented by the inventor of this invention, the use of water comprising strongly alkaline electrolysis water showing specific actions would permit the direct isolation of coating mist into a resin phase and an inorganic filler phase, respectively and the separate recovery of these two phases, efficiently and effectively.

In the present invention, the water which comprises strongly alkaline electrolysis water and which is subsequently brought into contact with coating mist should be one whose pH and ORP values are maintained at a level of not less than 9 and at a voltage of not more than +200 mV, preferably ranging from 0 mV to −960 mV and more preferably −200 mV to −960 mV.

If the pH value thereof is less than 9 and the ORP value exceeds +200 mV, the resulting water is insufficient in the ability to isolate the coating mist into a resin phase and an inorganic filler phase even when it is brought into contact with the coating mist and therefore, the use of such water could not permit the satisfactory isolation of the coating mist into these two phases.

In this respect, the term "pH (value)" herein used means a measure for indicating the degree of acidity or alkalinity, while the term "ORP (value)" herein used means the unit of oxidation-reduction potential. More specifically, if a certain substance has an ORP value of not more than 0 mV, the substance would be believed to have a reducing power and on the other hand, if the ORP value thereof is not less than 0 mV, the substance would be believed to have an oxidative power. These can be determined using any commercially available measuring machine.

The inventor of the present invention used herein an HM-30P Type pH Meter for the determination of pH values and an RM-30P Type ORP Meter for the determination of ORP values. Both of these measuring machines are those manufactured and sold by TOA DKK Co., LTD.

The water comprising strongly alkaline electrolysis water, herein used, preferably has a pH value of not less than 11 and most preferably not less than 12. It has currently been said or believed that the upper limit of the pH value is about 14 and the water comprising strongly alkaline electrolysis water, which can be used herein, may have a pH value of up to about this value.

In the present invention, the coating mist is collected by the action of an exhaust fan (or a suction fan) (indicated by the reference numeral 8 depicted on FIG. 1) and undergoes a reaction when the coating mist is stirred by directly bringing the same into contact with the water comprising strongly alkaline electrolysis water and allowing the former to collide with the latter, at a high velocity. As a result, the bulk of the coating mist is separated into a floating resin phase and a precipitated inorganic filler phase according to the mechanism as will be described in more detail later.

Examples of organic solvent-based coatings capable of being used in the present invention include alkyd resin type ones, amino-alkyd resin type ones, acrylic resin type ones, epoxy resin type ones, urethane resin type ones, and unsaturated polyester resin type ones and the method of the present invention can be applied to the spraying of these coatings.

The organic solvent-based coating comprises inorganic metal compounds such as those of titanium, barium, aluminum and lead and the treating method of the present invention permits the isolation of these inorganic metal compounds as each corresponding inorganic filler phase. It is a matter of course that the inorganic fillers may have a variety of shapes such as cylindrical, sword-like, lump-like shapes depending on circumstances, but they can be isolated according to the treating method of the present invention, irrespective of the shape thereof.

Moreover, the inorganic filler phase may sometimes contain a small quantity of the resin for coating adhered to the filler particles. In contrast with this, the resin phase may contain a small amount of the inorganic fillers. The resin phase has a low specific gravity since it is constituted by petroleum compounds, furthermore the inorganic fillers are released from the resin phase and the latter thus has a porous structure. As a result, the resin phase would have a structure quite susceptible for a sufficient buoyant force of a liquid medium and accordingly it can float on the water. In addition, the inorganic filler phase has a high specific gravity because of the presence of metal compounds therein and, for this reason, it would undergo sedimentation.

In this connection, it is preferred that the water comprising strongly alkaline electrolysis water, which is used in the present invention, be reused in and/or recirculated through the coating mist-treating system from the economical standpoint. In addition, even after the isolation of the coating mist into a resin phase and an inorganic filler phase, it is often observed that the recovered water comprising strongly alkaline electrolysis water may still contain fine particulate components, but the presence of such particulate components would not constitute any particular problem.

In the present invention, the coating mist and the water comprising strongly alkaline electrolysis water should be stirred by directly bringing the former into contact with the latter and allowing the former to collide with the latter, at a high velocity.

For instance, the coating mist is collected by a high speed air stream generated by the action of an exhaust fan (a suction fan) and preferably the coating mist is entrained in an air stream having a high speed on the order of not less than 10 m/sec so that the coating mist is thus directly brought into contact with the water comprising strongly alkaline electrolysis water and that the coating mist is allowed to collide with the water, at a high velocity. As a result, the coating mist and the water are vigorously stirred together and this results in the isolation of the coating mist (see FIG. 1).

The coating mist is constituted by an assembly of fine particles each of which is constituted by a resin component, a solvent and inorganic fillers incorporated into the resin component. In this respect, the surplus coating mist, which is not deposited on the surface of a subject to be coated during a coating step, is entrained in an air stream (indicated by the reference numeral 16 depicted on FIG. 1) generated by the exhaust fan (the suction fan) (indicated by the reference numeral 8 depicted on FIG. 1) attached to a paint spray booth, it is then drawn towards a stirring-mixing section or zone (indicated by the reference numeral 21 depicted on FIG. 1) in which the coating mist and the water comprising strongly alkaline electrolysis water directly come in contact with and collide with one another at a high velocity due to the action of the air stream having a high speed and generated in this section, wherein the air stream more preferably has a velocity of not less than 30 m/sec (in this respect, the air stream 16 discussed above is accelerated when it passes through a narrow opening 3, forms a turbulent flow because of the Reynolds effect and, at the same time, induce the generation of a negative pressure so that the water comprising strongly alkaline electrolysis water is thus sucked up and rises). Accordingly, this ensures the compulsory stirring and mixing of the coating mist and the water comprising strongly alkaline electrolysis water and the latter violently attacks the coating mist in such a manner that the inorganic filler is released or removed from the resin component.

According to this treatment, the removal of the inorganic filler from the resin makes the resin component porous and the resin component is thus present in the so-called porous and floating state and forms a resin phase. At the same time, the inorganic filler comprising a metal compound can undergo sedimentation and can be separated in the form of an inorganic filler phase (see, FIG. 4 which is an imaginary or hypothetic diagram for describing the mechanism of the isolation of coating mist).

Figure 2:
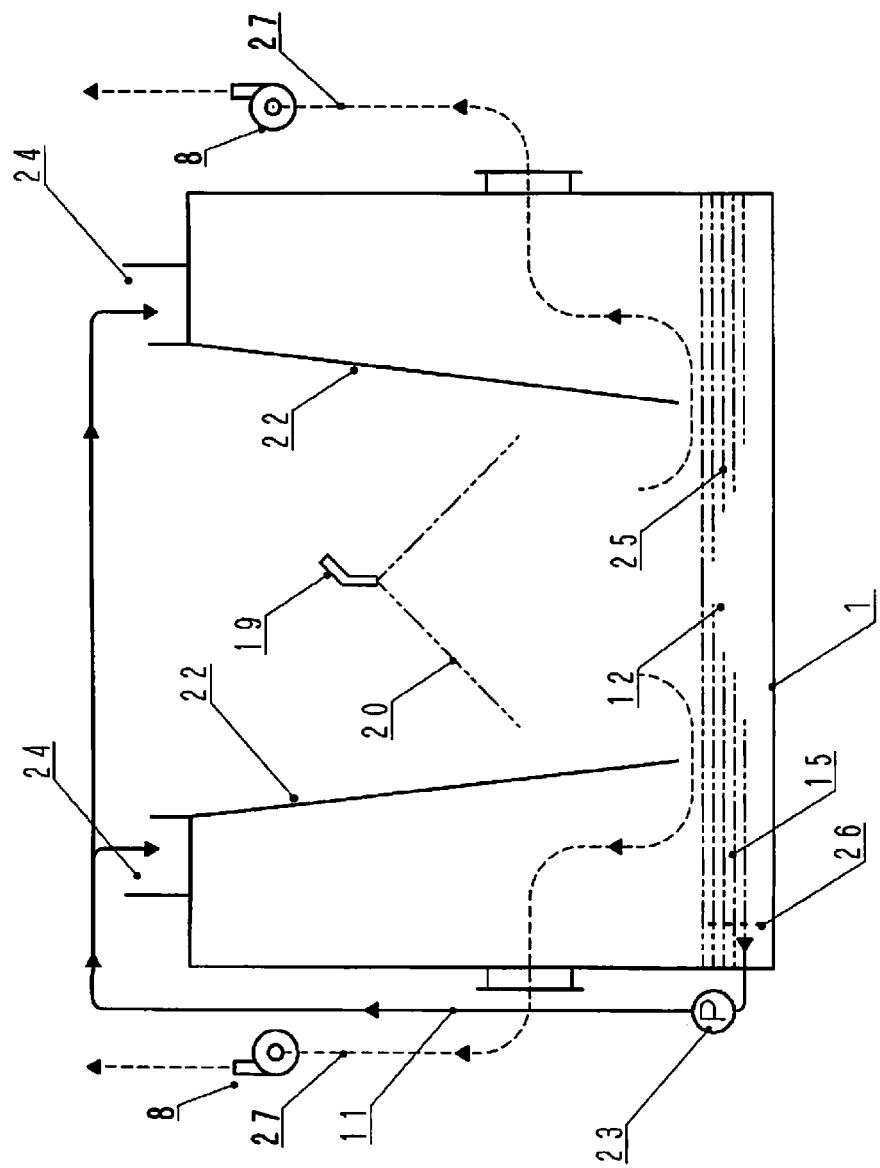
FIG. 2 is a diagram showing an example of the conventionally known devices for treating the coating mist of an organic solvent-based coating, which is provided with a paint spray booth.

Contrary to this, in case of the conventional method for treating the coating mist of an organic solvent-based coating, as shown in FIG. 2, or the method comprising the steps of providing a pool in which tap water, industrial water, underground water or the like is accumulated, as the circulating water, and collecting, in the pool, the coating mist of an organic solvent-based coating, which has been entrained in the circulating water, in the coating mist-treating device of a paint spray booth (a wet paint spray booth), it never ensures the achievement of such a function that "the coating mist is directly brought into contact with water which comprises strongly alkaline electrolysis water and whose pH value and ORP value are maintained at a level of not less than 9 and not more than +200 mV and the coating mist is allowed to collide with the water, at a high velocity", as in the present invention, even if adding the strongly alkaline electrolysis water used in the present invention to the pool. Accordingly, the coating mist would be present in the form of a sludge which is turbid because of the presence of fine coating particles and, in other words, the conventional method would simply results in the formation of a sludge in which resin phases and inorganic filler phases intermingle with each other.

The strongly alkaline electrolysis water used herein will now be described in more detail.

The strongly alkaline electrolysis water used in the present invention and prepared using a usual strongly alkaline electrolysis water-producing machine may have an ORP value of about −960 mV or it may likewise have an ORP value of not more than −960 mV.

The strongly alkaline electrolysis water can electrolytically be manufactured (prepared) from water and the principles and methods for the production thereof have widely been known and opened to the public, and are well-known techniques.

An electrolyte suitably used in the preparation of such strongly alkaline electrolysis water is an aqueous solution of potassium carbonate. Although potassium carbonate is used as an electrolyte, the resulting strongly alkaline electrolysis water is completely free of potassium carbonate. All of the BOD (biological oxygen demand), COD (chemical oxygen demand), N-hexane (oil content) and SS (suspended solid) values of the strongly alkaline electrolysis water thus prepared are zero since the water is completely free of any chemically synthesized substance.

The strongly alkaline electrolysis water used in the present invention is characterized in that it is an aqueous solution containing a large quantity of electrons and that it accordingly exhibits a strong intermolecular attractive force (electron-stripping action). The strongly alkaline electrolysis water thereby has a bactericidal effect due to this electron-stripping action. Furthermore, the strongly alkaline electrolysis water has a high dissolved hydrogen content and a low dissolved oxygen content and accordingly, the electrolysis water shows an effect of preventing any putrefaction of the electrolysis water per se and a deodorizing effect.

As the dissolved oxygen content of the electrolysis water is not more than 1/10 time that of pure water, the electrolysis water can form a passive film on the surface of a metal and accordingly, it has an effect of inhibiting any corrosion of metals.

The strongly alkaline electrolysis water used in the present invention has characteristic properties as specified in the following table 1:

TABLE 1

| characteristic properties unit | Alkalinity PH | at the time of the preparation ORP | Ionic Concentration ppm | Electrical Conductivity μs/m | Viscosity mPa/s | *Dissolved Hydrogen Content ppm | *Dissolved Oxygen Content ppm |
|---|---|---|---|---|---|---|---|
| Electrolysis Water | 13 | −960 | 2,300 | 2,700 | 1.2 | 1.048 | 3.76 |

Each of the * Dissolved Hydrogen Content and * Dissolved Oxygen Content is a value as determined at a pH value of 11.7.

These data are based on the materials of Juridical Foundation: Center of KITAZATO Environmental Science; and Cooperate Juridical Person: Test Center of the Society of Pharmacist in KANAGAWA Prefecture.

Then the following step of the method according to the present invention, which is a feature of the present invention, will be described in more detail below: "The spray mist of an organic solvent-based coating is directly brought into contact with the water which comprises strongly alkaline electrolysis water and whose pH value and ORP value are maintained at levels of not less than 9 and a level of not more than +200 mV, respectively and that it is allowed to collide with the water at a high velocity".

The purpose of using the foregoing step, employed in the present invention, of entraining the spray mist of an organic solvent-based coating in a high speed air stream in such a manner that the spray mist is directly brought into contact with the water which comprises strongly alkaline electrolysis water and whose pH value and ORP value are maintained at levels of not less than 9 and not more than +200 mV, respectively and that the spray mist is allowed to collide with the water at a high velocity, is to ensure the occurrence of the following phenomena: Particles 20 constituting coating material spray mist in which a resin for coating and an inorganic filler are dispersed in a solvent in an intermingled condition, are allowed to pass through a shower zone wherein the spray mist is sprinkled with water comprising strongly alkaline electrolysis water containing a large quantity of electrons (see FIG. 3, reference numeral 33) or preferably the frequency of the contact between the particles of the spray mist and the water comprising strongly alkaline electrolysis water is increased by stirring and mixing them at a high speed (see FIG. 1, reference numeral 21); thus, an electrical stripping action is evenly exerted on every particles of the coating material spray mist so that the solvent component is stripped and released from the particles and further an electrical repulsive force is thus generated or established between the resin and the inorganic filler of metal compounds to thereby isolate the particles into the resin and the inorganic filler (see FIG. 4).

Figure 4:
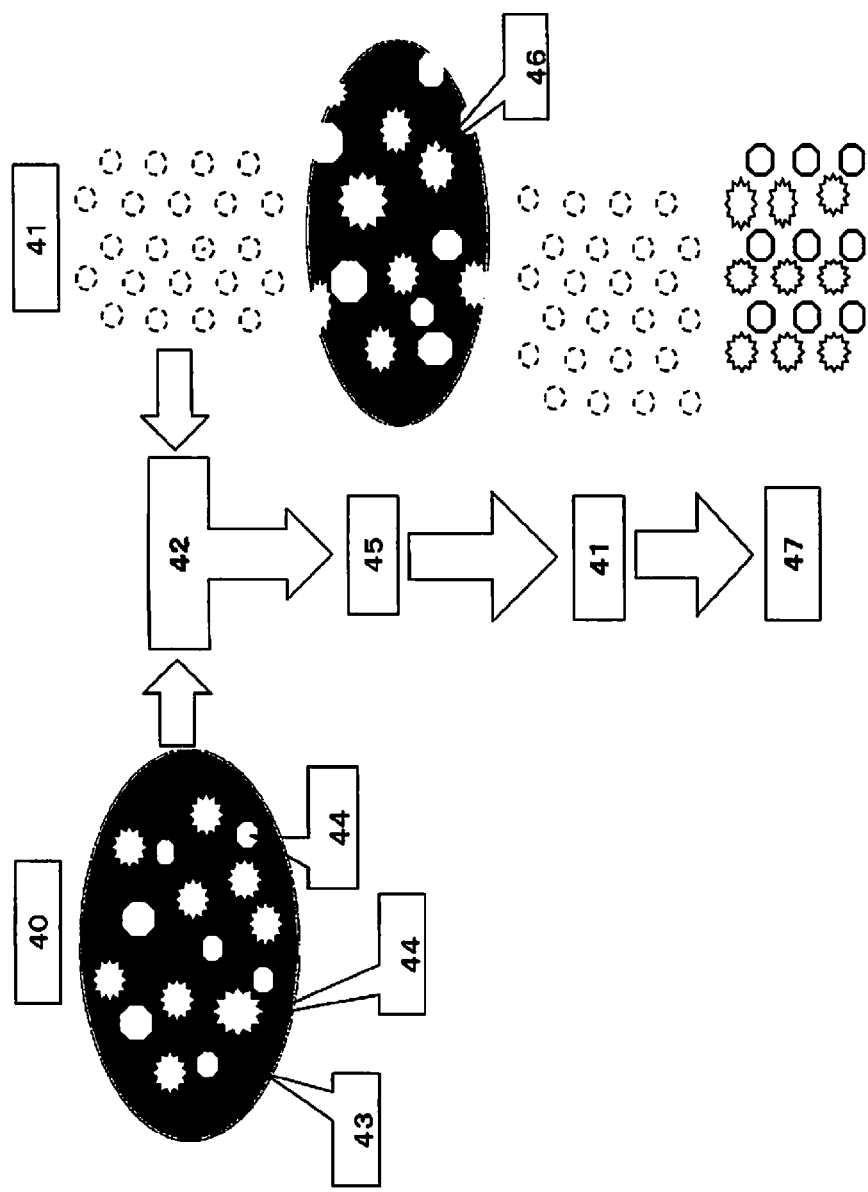
FIG. 4 is an imaginary or hypothetic diagram given for describing the mechanism of the isolation of coating mist according to the method of the present invention.
Figure 5:
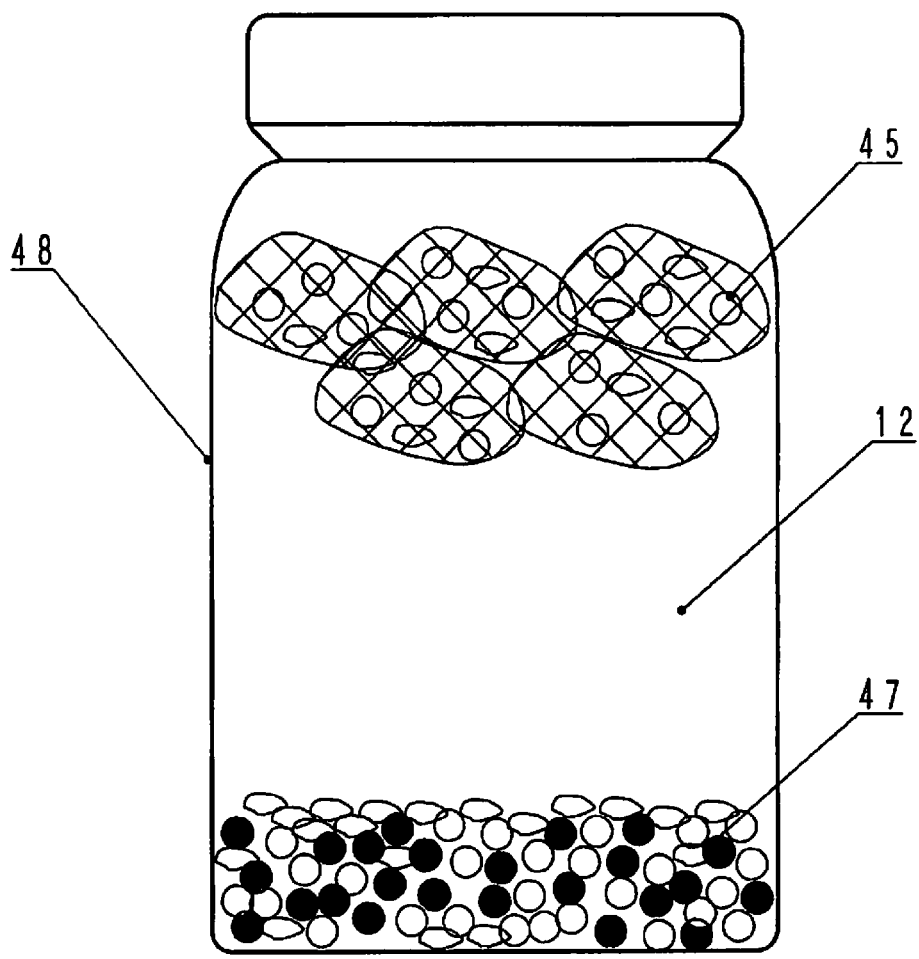
FIG. 5 is a diagram showing the image of a sample sludge isolated according to the present invention.

In respect of the resin and the inorganic filler thus released and/or stripped from one another, the resin is floated to thus form a resin phase 45 because of its low specific gravity, while the inorganic filler comprising metal compounds undergoes sedimentation to thus form an inorganic filler phase 47 because of its high specific gravity, and thereby they are isolated from one another (see FIGS. 4 to 5).

Figure 3:
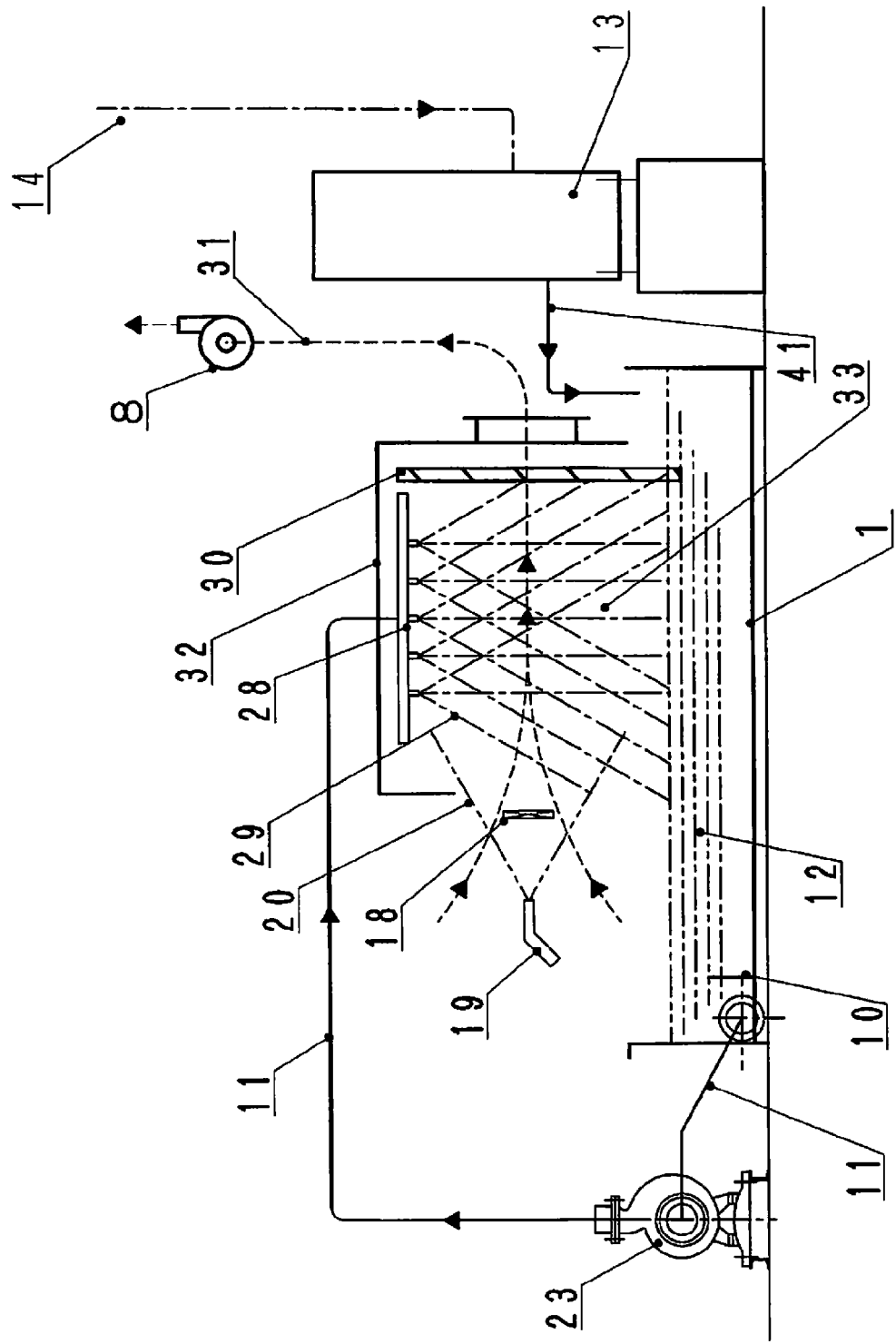
FIG. 3 is a diagram showing an example of the shower-type coating mist-treating devices each provided with a paint spray booth according to another embodiment of the present invention.

In an isolation bath 9, the sludge of coating present in the circulating water can be separated into a fraction having a floating ability and that capable of undergoing precipitation on the basis of the difference in the specific gravity between them (see FIGS. 1 and 3).

After the separation step, the inorganic fillers are attracted with each other due to the influence of the intermolecular potential established or generated on the metal whereby they undergo growth into particles each having a size ranging from about 0.1 to about 3 mm and then they are stabilized.

EXAMPLES

Embodiments of the present invention will be described below in the form of Examples, but these embodiments are herein given for making the understanding of the present invention easier and are not to be construed as limiting the scope of the present invention, at all. Accordingly, it is a matter of course that each element disclosed in respect of the following embodiments embrace or cover all of the changes of design and the equivalents falling within the technical scope of the present invention.

Specific embodiments of the present invention will hereunder be described with reference to the attached FIGS. 1 to 5.

Example 1

Referring to FIG. 1, a coating mist-treating device, which is placed side by side with a paint spray booth 17, is principally constituted by a storage tank 1 in which circulating water 12 (in other words, water which comprises strongly alkaline electrolysis water and whose pH value and ORP value are maintained at a level of not less than 9 and not more than +200 mV (the pH value and the ORP value may vary depending on the positions of the circulating water, at which they are determined)) is stored, a scrubber 2 (a unit for isolating the air from the water) and an isolation bath 9.

Coating operations were carried out by spraying, through a spray gun 19, a subject to be coated 18 with a solvent-based coating (the coating prepared by further adding a diluent solution to an acrylic resin-containing coating and controlling the viscosity thereof to a level of about 10 seconds while dispensing the diluent solution with a viscosity measuring cup), in the paint spray booth 17 (a wet paint spray booth).

A negative pressure was induced or established within the scrubber 2 by the evacuation of air in the scrubber using an exhaust fan 8 (a suction fan) and accordingly, a high speed air stream as indicated in the figure by arrows was generated through a small gap 3 formed between the lower edge 5 of the scrubber 2 and the surface of the circulating water 12.

The surplus of the coating mist generated during the coating operations is entrained in this air stream and it is then drawn in the scrubber 2 through the small gap 3 formed between the lower edge 5 of the scrubber 2 and the surface of the circulating water 12 (at this stage, the foregoing air stream is converted into a high speed air stream whose velocity amounts to even a level on the order of not less than 10 m/sec upon the passage thereof through the small gap 3). Thus, the high speed air stream whose velocity amounts to even a level of not less than 10 m/sec, the circulating water 12 and the coating mist 20 are compulsorily stirred and mixed together in a stirring-mixing zone 21 formed or constructed by a reflector 6 (or a spiral plate having a circular arc-like cross section) positioned in the proximity to the gap 3, while they are strongly rotated along the reflector (or the spiral plate having a circular arc-like cross section).

Furthermore, the mixed circulating water 12 entrained by the high speed air steam collides with an eliminator 4 (a collision plate) placed within the scrubber 2, the circulating water thus loses its power, the circulating water 12 in which the coating mist 20 has been collected comes down in the form of water drops and runs down to an isolation bath 9 through a drop opening 7 of the scrubber 2. During this process, the majority of the solvent component is released from the coating mist and discharged in the air by the action of the exhaust fan 8 (the suction fan).

The isolation bath 9 is equipped with a weir 10. The weir 10 is mounted on the bottom of a water storage tank 1 and the upper portion thereof is sank under the surface of the water at a depth of about ¼ time that of the water contained in the tank. For this reason, the precipitated sludge 47 of an inorganic filler phase (see FIGS. 4 to 5) is collected at the front side of the weir 10 since the stream of water is obstructed by the weir 10, while the floating or suspended resin phase 45 (see FIGS. 4 to 5) is entrained in the water current and then gathers on the inner wall of the isolation bath 9.

The mixed circulating water is returned back to the foregoing storage tank 1 through a pipe arrangement 11 which is communicated to the storage tank 1 on the downstream side of the isolation bath 9 and the circulating water thus recovered may again be used as the circulating water 12 for collecting coating mist.

In the isolation bath 9, the inorganic filler phase 47 converted into precipitates are left in the front portion of the bath or in front of the weir due to the presence of the weir, while the resin phase 45 (see FIGS. 4 to 5) converted into a floating material is accumulated and deposited on the inner wall of the isolation bath 9. Therefore, these precipitates and floating material can automatically or manually be discharged from the isolation bath.

In FIG. 1, the surface level of the circulating water stored in the storage tank 1 is controlled so as to appropriately adjust the size of the aforementioned gap 3 and to thereby satisfactorily ensure the compulsory stirring and mixing operations or functions in the stirring-mixing zone 21 and, at the same time, the strongly alkaline electrolysis water 41 derived from a strongly alkaline electrolysis water-manufacturing machine 13 is supplied to the storage tank 1, according to circumstances, so that the pH and ORP values of the circulating water 12 are likewise controlled.

In addition, as shown in FIG. 4, the principal mechanism of the isolation of an organic solvent-based coating mist 40 through the use of the water comprising strongly alkaline electrolysis water (in other words, the circulating water 12) would be assumed to be as follows:

1) The inorganic filler 44 present in the organic solvent-based coating mist 40 is separated from the coating under the attack of the water which comprises strongly alkaline electrolysis water 41 (i.e., the circulating water 12) to thus form precipitates.

2) The inorganic filler 44 which is most susceptible to the attack of the strongly alkaline electrolysis water 41 is a titanium-containing component (titanium oxide).

The portions which had been occupied by the inorganic filler 44 constitutes void parts 46, this makes the specific gravity of the resin phase lighter and accordingly, the resin phase 45 is floated, while the inorganic filler phase 47 undergoes sedimentation. More specifically, the isolation of the coating mist would accordingly be quite easy.

When the inventor of this invention collected coating mist using a coating mist-treating device which had been put side by side with the paint spray booth 17 having the structure as shown in FIG. 1, according to such procedures as those described in the foregoing paragraphs [0029] to [0039] and thereafter the inventor made observation of the circulating water 12 collected at the position in the proximity to the drop opening 7 of the scrubber 2, it was found that a coating resin phase 45 and an inorganic filler phase 47 are isolated from the coating mist within a time period of about several hours (see FIG. 5).

The resulting precipitates 47 (the inorganic filler phase) and the floating matter 45 (the resin phase) were then analyzed and as a result, it was confirmed that they contain components such as titanium, aluminum and barium. The following table 2 shows measured values of the metals included in the coating sludge (the foregoing inorganic filler phase and the resin phase).

TABLE 2

| | | Metal | Resin Phase A | Inorganic Filler Phase B | No Isolation | Ratio A:B (times) |
|---|---|---|---|---|---|---|
| 1 | Al | aluminum | 0.02 | 1.8 | 2.7 | 90 |
| 2 | Si | silicon | 0.17 | 2 | 2.7 | 12 |
| 3 | P | phosphorus | 0.01 | 0.3 | 0.22 | 30 |
| 4 | Ca | calcium | 0.03 | 0.6 | 0.61 | 20 |
| 5 | Ti | titanium | 0.65 | 11.4 | 17.6 | 18 |
| 6 | Fe | iron | 0.05 | 1.1 | 1.4 | 22 |
| 7 | Zn | zinc | 0.04 | 0.63 | 0.47 | 16 |
| 8 | Ba | barium | 0.21 | 1.6 | 0.73 | 8 |

Analyst: The analysis was carried out by Industrial Technology Center of KANAGAWA Prefecture;

Analytical Method:

Potassium (K): IPC Emission Spectroscopic Analysis Technique;

Potassium Ion ($K^+$): Ion Chromatography Technique.

Moreover, the device as shown in FIG. 1 makes use of water, which comprises strongly alkaline electrolysis water 41, according to the present invention and therefore, the circulating water 12 in the storage tank 1 would never undergo any putrefaction, no bad smell is accordingly scattered about the surrounding environment and the device can provide good working environment and surrounding environment. Furthermore, the device permits the construction of a closed spray system, it is not necessary to replacing the circulating water 12 with fresh one all the year round and this in turn permits the substantial reduction of the required expense.

In the device as shown in FIG. 4, if using water comprising strongly alkaline electrolysis water 41, the water strongly attacks organic solvent-based coating mist 40 and this makes the resin phase 43 release inorganic fillers 44 from the same. This treatment would also destroy highly viscous substances connected or bound to the coating material upon the isolation of the coating mist into the resin phase 43 and the inorganic filler phase 44. Accordingly, the bubbling or foaming of the sludge is reduced and the viscosity thereof is likewise lowered.

For this reason, the operators are rarely troubled with problems of high viscosity and of severe foaming when handling the coating mist till the final disposal of the spray mist.

Example 2

The same procedures used in Example 1 were repeated except for using a shower type coating mist-treating device as shown in FIG. 3. More specifically, the coating mist 20 and the shower 29 of circulating water 12 were stirred and mixed together at a high speed to thus separate the coating mist into a resin phase and an inorganic filler phase and to thereby recover these two different phases in the same manner used in Example 1.

Comparative Example 1

Figure 6:
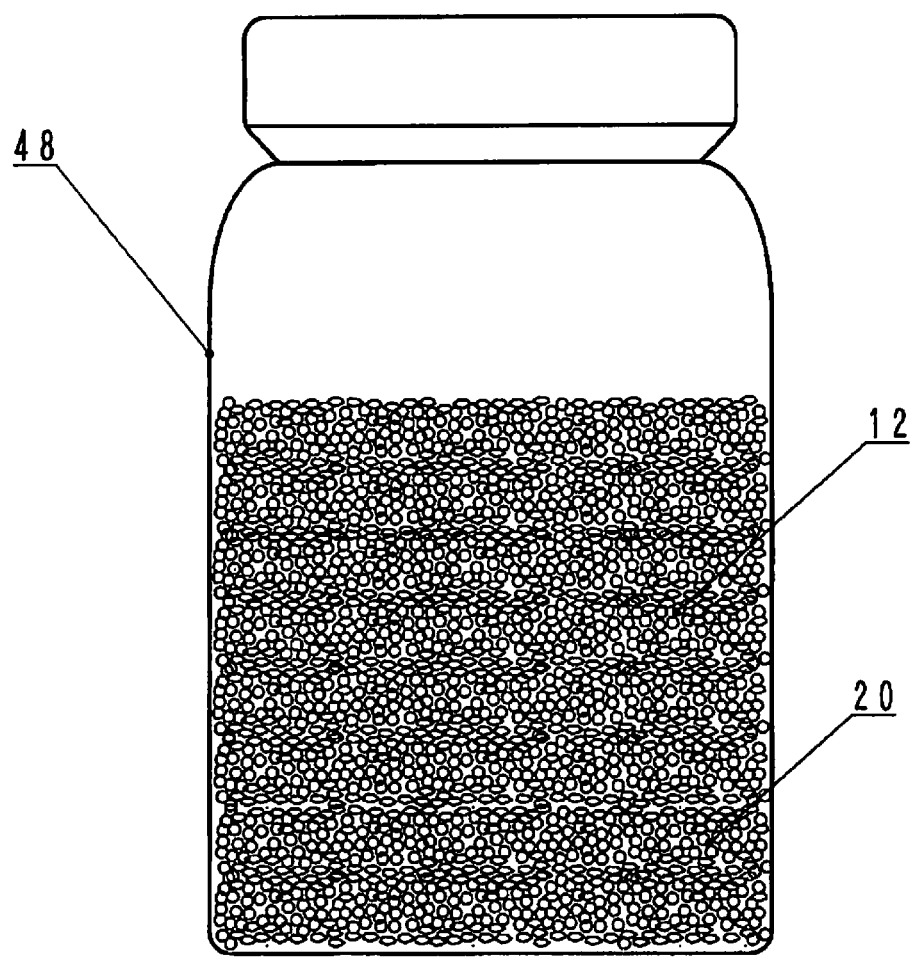
FIG. 6 is a diagram showing an image of a sample sludge which did not undergo any separation and which was prepared in Comparative Example 1.

An experiment was carried out by repeating the same procedures used in Example 1 except that currently used city water (the pH and OPR values thereof were found to be 6.5 and +680 mV, respectively) was substituted for the water comprising strongly alkaline electrolysis water 41. As a result, it was found that the organic solvent-based coating mist 40 was never separated into floating matters and precipitates (see FIG. 6).

In addition, in case where currently used city water is employed, it begins to undergo putrefaction within several weeks after the initiation of the treatment and any progress of such putrefaction cannot be prevented even if using an agent such as a flocculating agent. Further a coating having a high resin content is liable to cause a foaming phenomenon when it comes in contact with the circulating water and accordingly, the foaming phenomenon had to be arrested by the introduction of an agent (antifoaming agent) into the circulating water. To this end, the circulating water should be replaced with fresh one over 3 to 4 times per year. In particular, the putrefaction of the circulating water rapidly proceeds in a high temperature and humidity season such as the summer season and therefore, an enterprise who is not thoroughly furnished with any drainage facility must entrust the effluent treatment to a company treating industrial waste. Accordingly, such an enterprise must bear considerable expense required for the effluent treatment.

Comparative Example 2

Organic solvent-based coating mist 20 was treated according to the method for treating organic solvent-based coating mist 20 as shown in FIG. 2, while employing "the water which comprises strongly alkaline electrolysis water and which has pH and ORP values ranging from 9 to 12 and +200 mV to −900 mV, respectively" used in Example 1. However, it was found that the recovered coating mist 20 is a sludge-like material which is turbid due to the presence of fine coating particles and that this sludge is one in which a resin phase 43 and an inorganic filler phase 44 are intermingled with each other (see FIGS. 4 and 6).

INDUSTRIAL APPLICABILITY

The present invention can be used in applications wherein coating mist of an organic solvent-based coating used in the general coating procedures is directly isolated into a resin phase and an inorganic filler phase to thus recover these two phases separately.

EXPLANATION OF SYMBOLS

1 Storage Tank
2 Scrubber
3 Gap
4 Collision Plate;
5 Lower Edge
6 Reflector
7 Drop Opening 8 Exhaust Fan (Suction Fan)
9 Isolation Bath
10 Weir
11 Pipe Arrangement
12 Circulating Water
13 Strongly Alkaline Electrolysis Water
14 Raw Water
15 Sludge
16 Air Stream
17 Paint Spray Booth
18 Subject to be Coated
19 Spray Gun for Coating
20 Coating Mist
21 Mixing-Stirring Zone
22 Water Curtain Plate
23 Pump
24 Conduit Pipe
25 Flocculating Agent
26 Filter
27 Air Stream
28 Shower Nozzle
29 Shower
30 Eliminator
31 Duct
32 Casing
33 Shower Zone
40 Coating Mist
41 Water Comprising Strongly Alkaline Electrolysis Water
42 Compulsory Stirring-Mixing
43 Resin Phase
44 Inorganic Filler
45 Floating Resin Phase
46 Void Part
47 Precipitated Inorganic Filler Phase
48 Container

The invention claimed is:

1. A method for treating spray mist of an organic solvent-based coating, comprising, in a method for collecting a spray mist of the organic solvent-based coating:

collecting the spray mist of the organic solvent-based coating by bringing the spray mist into direct contact with water which comprises electrolytically-generated strong alkaline water having a pH value and an oxidation-reduction potential (ORP) value maintained at a level of not less than 9 and a level of not more than +200 mV, respectively, and leading the spray mist to collide with the water, at a velocity of not less than 10 m/sec, to thereby form solid contents comprising a floating resin phase and a precipitated inorganic filler phase; and, subsequently separating the resulting solid contents from the water comprising the electrolytically-generated strong alkaline water.

2. The method for treating spray mist of an organic solvent-based coating according to claim 1, comprising:

adding an electrolytically-generated strong alkaline water having a pH value of not less than 9.5 and an ORP value ranging from −960 mV to 0 mV to the water comprising the electrolytically-generated strong alkaline water from which the solid contents have been separated to form a resulting water having a pH value of not less than 9 and an ORP value of not more than +200 mV, respectively; and, directly contacting said resulting water with the spray mist at a velocity of not less than 10 m/sec.

3. The method for treating spray mist of an organic solvent-based coating according to claim 2, wherein the added electrolytically-generated strong alkaline water has a pH value ranging from 11 to 14 and an ORP value ranging from −960 mV to −200 mV.

4. The method for treating spray mist of an organic solvent-based coating according to claim 1, wherein the spray mist of the organic solvent-based coating is directly brought into contact with the water which comprises electrolytically-generated strong alkaline water and whose pH value and ORP value are maintained at a level of not less than 9 and a level of not more than +200 mV, respectively, and is allowed to collide with the water at a velocity of not less than 10 m/sec, while the spray mist is entrained in an air stream having a speed of not less than 10 m/sec, to thus compulsorily agitate and mix the spray mist and the water, and thereby isolate a floating phase mainly comprising a resin for coating and a precipitated inorganic filler phase mainly comprising a metal compound from the spray mist.

5. The method for treating spray mist of an organic solvent-based coating according to claim 1, wherein the water comprising electrolytically-generated strong alkaline water from which the solid contents have been separated is recycled and reused.

* * * * *